US007424378B2

(12) United States Patent
Rieger

(10) Patent No.: US 7,424,378 B2

(45) Date of Patent: Sep. 9, 2008

(54) METHOD AND DEVICE FOR COMMUNICATION WITH A PLANT

(75) Inventor: Gottfried Rieger, Fürth (DE)

(73) Assignee: Siemens Aktiengesellschaft, Munich (DE)

(*) Notice: Subject to any disclaimer, the term of this patent is extended or adjusted under 35 U.S.C. 154(b) by 129 days.

(21) Appl. No.: 10/571,844

(22) PCT Filed: Sep. 22, 2004

(86) PCT No.: PCT/EP2004/010641

§ 371 (c)(1), (2), (4) Date: Mar. 15, 2006

(87) PCT Pub. No.: WO2005/031674

PCT Pub. Date: Apr. 7, 2005

(65) Prior Publication Data

US 2007/0078615 A1 Apr. 5, 2007

(30) Foreign Application Priority Data

Sep. 24, 2003 (DE) ................................ 103 44 359

(51) Int. Cl.
*G06F 19/00* (2006.01)

(52) U.S. Cl. ........................................................ 702/63

(58) Field of Classification Search .................... 702/63
See application file for complete search history.

(56) References Cited

U.S. PATENT DOCUMENTS

| | | | | |
|---|---|---|---|---|
| 5,587,924 | A | 12/1996 | Rossi | |
| 6,965,309 | B1 * | 11/2005 | Bleznyk et al. | 340/521 |
| 2001/0022518 | A1 * | 9/2001 | Asakura et al. | 324/426 |

FOREIGN PATENT DOCUMENTS

WO WO 02/49509 A2 6/2002

* cited by examiner

*Primary Examiner*—Tung S Lau

(57) ABSTRACT

The invention relates to a method and a device for communication with a plant, in particular, for the operation and monitoring of an automated plant in industrial manufacture. The state of charge of the battery, in a battery-operated communication device, for exchange of data with the plant, is recorded. The predicted remaining operation time of the communication device is determined from the state of charge and, depending on the state of charge, measures are taken in the plant, or in the communication device.

11 Claims, 3 Drawing Sheets

METHOD AND DEVICE FOR COMMUNICATION WITH A PLANT

CROSS REFERENCE TO RELATED APPLICATIONS

This application claims priority to the German application No. 10344359.2, filed Sep. 24, 2003, and to the International Application No. PCT/EP2004/010641, filed Sep. 22, 2004 which are incorporated by reference herein in their entirety.

FIELD OF INVENTION

The invention relates to a method and a device for communication with a plant, in particular for the operation and monitoring of an automated plant in industrial manufacture.

BACKGROUND OF INVENTION

Industrial automated plants need input or output devices connected to them in order to be able to be operated; this is known as process interfacing. Output devices or, in other words, monitoring devices are, for example, control lamps and alphanumeric or graphic displays which inform the plant operator about the current state of the plant. Input devices or, in other words, operator devices are e.g. switches, rotary knobs or keyboards for alphanumeric inputting, which enable the operator to interfere with the plant.

SUMMARY OF INVENTION

Conventionally, operator and monitoring devices, hereinafter called communication devices for short, are, for the purposes of communication between user and plant, permanently installed in the plant itself or e.g. in the manufacturing workshop in which the plant is located. A typical communication device has a handy housing on which input and output devices are arranged. Data is exchanged with the plant or with the control unit thereof via a permanently installed connecting line.

In the case of very large or difficult-to-access plants, cable-bound communication devices are no longer manageable. For this purpose, mobile, i.e. freely movable, communication devices, communicating wirelessly with the plant and being battery-operated, exist, which handle the exchange of data with the plant via a radio link.

The wirelessly operating communication devices must, in conformance with various industry standards, be equipped with safety functions, with the aid of which in the event of danger a safe state can be achieved for the plant. For radio-based communication devices, these generally involve the so-called stop function. The stop function is implemented as a rule in a safety key on the communication device. Pressing this key causes the immediate shutdown of the plant.

Consent functions can also be provided on the communication device. The consent function is triggered by means of a safe, two- or three-stage consent key, in order, with the key in the pressed or half-pressed position, to trigger safety-critical movements such as e.g. the displacement of a plant part or the movement of a robot arm. Releasing or depressing fully (panic function) the consent key causes the relevant movement to be immediately stopped, i.e. the consent to this movement is withdrawn, so to speak.

In communication devices operating wirelessly and being therefore battery-operated, the duration of use is naturally limited by the energy stored in the battery or the accumulator. A complete draining of the battery would result in communication between communication device and plant breaking down, and consequently no more information would be transmitted to the plant. The consent given at the communication device shortly before disconnection of the link could no longer be withdrawn or the stop function triggered. Solutions current today have, in addition, backup mechanisms on the plant side which e.g. upon disconnection of the radio link to the communication device result in the immediate shutdown of the plant and thus also the withdrawal of any consent.

In ongoing production, however, a plant shutdown must be avoided as far as possible, on cost and expenditure grounds. Consequently, the aim above all is to prevent the plant being brought to a halt simply on account of the battery in the mobile communication device being drained and not because of an actual hazardous situation.

Normally, the mobile communication device logs off from the plant in a controlled manner without the radio link being torn down, whereupon said plant is again operated and monitored via e.g. permanently installed cable-bound communication devices but continues to run normally, without the safety shutdown being triggered. Also, in known communication devices there are displays indicating the state of charge of the battery. From these, the operator has to draw the correct conclusions himself, e.g. terminate the operation and monitoring of the plant at the correct time with the aid of the mobile communication device and log off said communication device from the plant so as not to activate the plant's own safety functions.

An object of the invention is to indicate a method and a device so as to enable the operator to use full battery capacity where possible, and yet to avoid shutdown of the plant caused by the battery being drained.

The object is achieved in a method for communication with a plant, in particular for the operation and monitoring of an automated plant in industrial manufacture. In this method, a battery-operated communication device is available for the exchange of data with the plant. The state of charge of the battery is determined and the expected remaining operating time of the communication device determined from the state of charge. Depending on the remaining operating time determined, a measure is taken in the plant or in the communication device.

From the remaining operating time of the communication device determined, that is, the time which still remains to its user for communicating wirelessly with the plant, a useful variable is determined which can be further processed in the plant or in the communication device. The time, e.g. in minutes, provides substantially more useful information than knowledge about the state of charge of the battery e.g. in per cent.

Based upon the time determined, measures can be taken in the plant or in the communication device. This can consist e.g. in reducing the power consumption in the communication device by lowering the brightness of a display located therein. Or, as a measure where the remaining operating time is adequate, no information about the state of charge or remaining operating time is displayed to the user. He is not distracted by this since he does not at this time need to be concerned about the state of charge. Other measures can be the output of an acoustic, optical or mechanical alert to the user, e.g. through the communication device beeping, flashing or vibrating when the remaining operating time approaches zero.

It is particularly advantageous for a threshold value to be specified for the remaining operating time and for the measure to be taken when the threshold value is reached. The threshold value can in this case be individually set for each plant. If the operator needs e.g. only a little time in order to complete any work with the communication device, then the threshold value can be kept very low so that as a rule, i.e. for most states of charge of the battery, the operator is never confronted with measures. For remaining operating times above the threshold value, the user is e.g. not inconvenienced and the functionality of the communication device is fully available. The operator does not need to process any additional information.

An advantageous measure is to display the remaining operating time to the operator. The display can be provided permanently or only below a given threshold value for the remaining operating time.

The remaining operating time is displayed in minutes e.g. via an alphanumeric display in the communication device.

Where the remaining operating time is displayed instead of the state of charge of the battery, e.g. in per cent, the user can make a substantially better assessment of whether or of which works he can still complete properly in the remaining operating time that is left before the battery is completely drained. The user can in this way utilize as far as possible almost the full operating time of the communication device and yet still log off the communication device from the plant in good time, i.e. surrender control of the mobile communication device properly and thus avoid at the plant end the automatic safety shutdown of the entire plant.

As a measure in a preferred embodiment, the functionality of the communication device is changed depending on the remaining operating time. Changing the functionality makes it possible to guide the user selectively and to relieve him of having to make decisions. For example, the user can never initiate functions in the plant via the communication device which cannot be completed within the remaining operating time determined. This prevents the user initiating a process that takes too long, which would necessarily lead to the activation of safety functions at the plant end because of the radio contact being torn down after the battery had been drained. The user is also unable to activate such processes inadvertently.

In a preferred embodiment, multiple threshold values are predetermined and the functionality of the communication device gradually changed as each threshold value is reached. In this way, a selective user control can be implemented in the communication device whereby e.g. the functionality thereof is gradually increasingly restricted e.g. as the remaining operating time decreases. In this way, the operator has to restrict himself more and more when operating the plant as the remaining operating time decreases.

By this means, he can be guided toward constantly safe use of the communication device, thereby being relieved of much responsibility for incorrect operation of the communication device.

Gradually changing the functionality enables e.g. escalation levels to be implemented in the communication device, ranging from unrestricted normal operation via warnings and restricted functionality to automatic intervention in the functions that can be triggered by the communication device or the bringing of the plant to a halt.

In a preferred embodiment, the functionality is changed to the effect that a consent function which can be triggered in the plant by the communication device is compulsorily deactivated. Consequently, as of a defined remaining operating time, a consent function that has possibly been given by the user is automatically cancelled and moreover cannot be reactivated. This prevents the user, for example, from continuing to carry out safety-relevant displacement movements in a plant for which there is no longer sufficient time available to him on the communication device. Safe operation of a plant is constantly ensured by this means.

In a further preferred embodiment, the functionality is changed to the effect that a stop function which can be triggered in the plant by the communication device is compulsorily activated. This provides, for example, a final safety stage for triggering safe shutdown of the plant if the user, despite all warnings about the remaining operating time that is left, has, prior to the complete draining of the battery, and the tearing down of the radio link that is necessarily associated therewith, omitted to surrender control of the mobile communication device in a defined manner.

The object is furthermore achieved in a device for communication with a plant, in particular for the operation and monitoring of an automated plant in industrial manufacture. The device has a communication device, containing a battery, for the exchange of data with the plant. It also has a measuring device for determining the state of charge of the battery and the expected remaining operating time of the communication device. In addition, it has a control device, interacting with the measuring device, for taking measures in the plant or in the communication device.

The battery is as a rule a rechargeable accumulator. The measuring device can be e.g. a standard module for measuring the state of charge of the accumulator, which is nowadays sometimes integrated in the accumulator itself. In connection with e.g. a current sensor for determining the present current requirement of the communication device, possibly linked with a program module in the operating software of the communication device, the calculation of the remaining operating time can be made in this way. The control device is also implemented for example as a program module or else as a corresponding control IC which emits different electrical control signals depending on the state of charge.

Particularly advantageously, a threshold switch is contained in the device, which threshold switch interacts with the measuring device and the control device. This threshold switch is implemented e.g. as an electrical comparator or as a program module and, depending on the remaining operating time, triggers a measure by emitting a control signal.

It is also advantageous if the device has a display device for the remaining operating time. This can be a separate display in the form of a luminous bar inscribed with time indications, but also the overlaying of the time display in an alphanumeric display which is in any case present in the communication device.

Advantageously, a change-over switch is provided in the device, which change-over switch interacts with the measuring device and is thus coupled to the remaining operating time. The change-over switch can be e.g. a program module of the operating software located in the communication device in order to change the functionality of the communication device.

An advantageous embodiment of the device provides a consent switch which can be deactivated by the change-over switch. If, for example, deactivation of the consent switch is provided as a measure, then the consent switch can be deactivated by means of the change-over switch, i.e. the electrical contact in the consent switch is interrupted completely. Even pressing on the consent switch will thus no longer produce an electrical connection and the consent is withdrawn and moreover can no longer be activated.

It is also advantageous to provide a stop key which can be activated by the change-over switch. In this way, the contact in the stop key can be closed by the measure of activating the stop key without the switch actually being pressed by the user. This is equivalent to a forced pressing of the stop key.

BRIEF DESCRIPTION OF THE DRAWINGS

In the description that follows, reference is made to the exemplary embodiment in the drawings, in which.

DETAILED DESCRIPTION OF INVENTION

Figure 1:
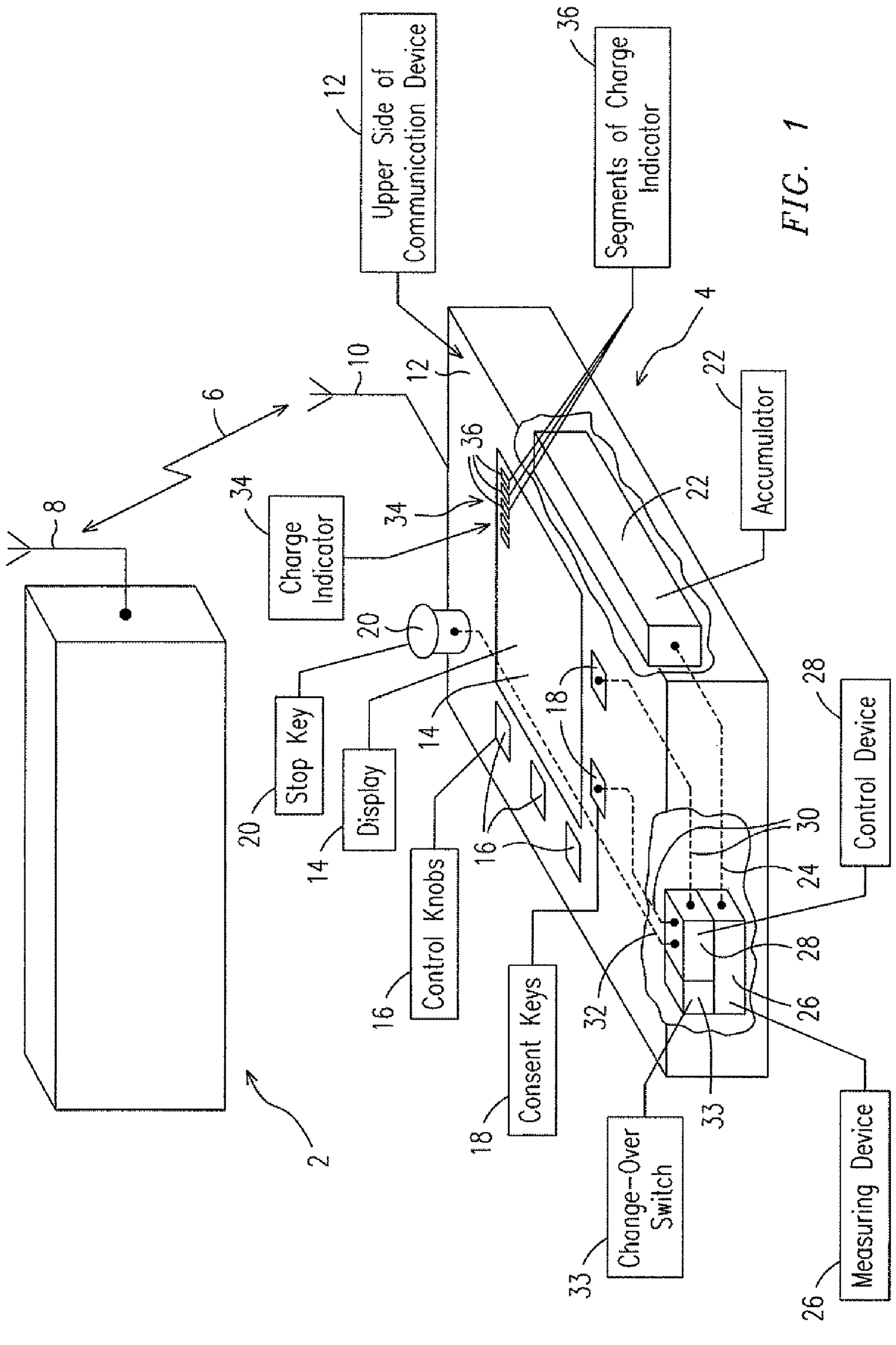
FIG. 1 shows schematically a perspective diagram of an automated plant with a mobile communication device.

FIG. 1 shows a plant 2 for industrial manufacture with a communication device 4, in a partially open representation, for wirelessly exchanging data with the plant 2. The wireless exchange of data takes place via a radio path 6 between two antennas 8 and 10 mounted on the plant 2 and on the communication device 4.

The communication device 4 has a rectangular display 14 arranged centrally on the upper side 12 of said device. Control knobs 16 are located to the left and right of the display 14, arranged parallel to the edge of the display, of which control knobs only the two on the left are visible in FIG. 1. Two consent keys 18 are arranged parallel to the lower side of the display 14, on the lower edge thereof. A stop key 20 is mounted on the communication device 4 above the display 14.

Located in the interior of the communication device 4 is an accumulator 22 which supplies said communication device with electrical energy. A measuring device 26 for determining the state of charge of the accumulator 22 is connected to the accumulator 22 via a measuring line 24. The measuring device 26 is connected to a control device 28. The control device 28 is in turn connected via control lines 30 and 32 to the consent keys 18 and the stop key 20.

A change-over switch 33 is integrated in the control device 28, which change-over switch is also connected to the measuring device 26. The change-over switch 33 serves to influence the functionality of the communication device 4, that is, for example, to influence the display 14 and the function of the keys 16 and consent keys 18. The change-over switch 33 consequently influences the operating software running in the communication device 4 or the plant 2.

Pressing the stop key 20 causes an immediate plant shutdown in the plant 2. The functionality of the stop key 20 therefore corresponds to that of an industry-standard red/yellow emergency OFF key. However, the stop key 20 must not be fashioned red/yellow since it functions only battery-dependently and its tripping is transmitted to the plant 2 only via an unsafe radio link 6.

The control knobs 16 and consent keys 18 are assigned different functions, depending on the programming of the plant or of the communication device 4 and the respective status of the control program running in the communication device 4; they are so-called softkeys. The consent keys 18 are in this case assigned safety-relevant functions which are activated only when the consent keys 18 are held down. For example, pressing on the left-hand consent key 18 causes the displacement of a robot arm in the plant 2. Releasing the corresponding key 18 stops this movement immediately.

Via the control line 32 the stop key 20 can be activated, i.e. the plant 2 halted without said stop key actually being pressed mechanically. The control lines 30 by contrast cause withdrawal of the consent function in the consent keys 18, i.e. their deactivation, without said consent keys actually being released. Also pressing on the consent key 18 again does not bring about a new consent function.

The display 14 is a graphics-capable matrix display which is also freely programmable depending on the software program in the plant 2 or in the communication device 4. A charge indicator 34 which reflects the state of charge of the accumulator 22 in the communication device 4 is located in the top right-hand corner of the display 14. In FIG. 1, the accumulator is approximately three-quarters charged, which is why six of the eight segments 36 of the charge indicator 32 are shown as solid black bars. From this indicator, the user operating the communication device 4 will see that he has sufficient energy available in the accumulator 22 in order to be able to work with the communication device 4 initially without restriction.

FIG. 2 shows a mobile, portable communication device 4 in an alternative round embodiment, comprising a total of eight control knobs 16 and five consent keys 18. The communication device 4 is shown in top view.

Figure 2A:
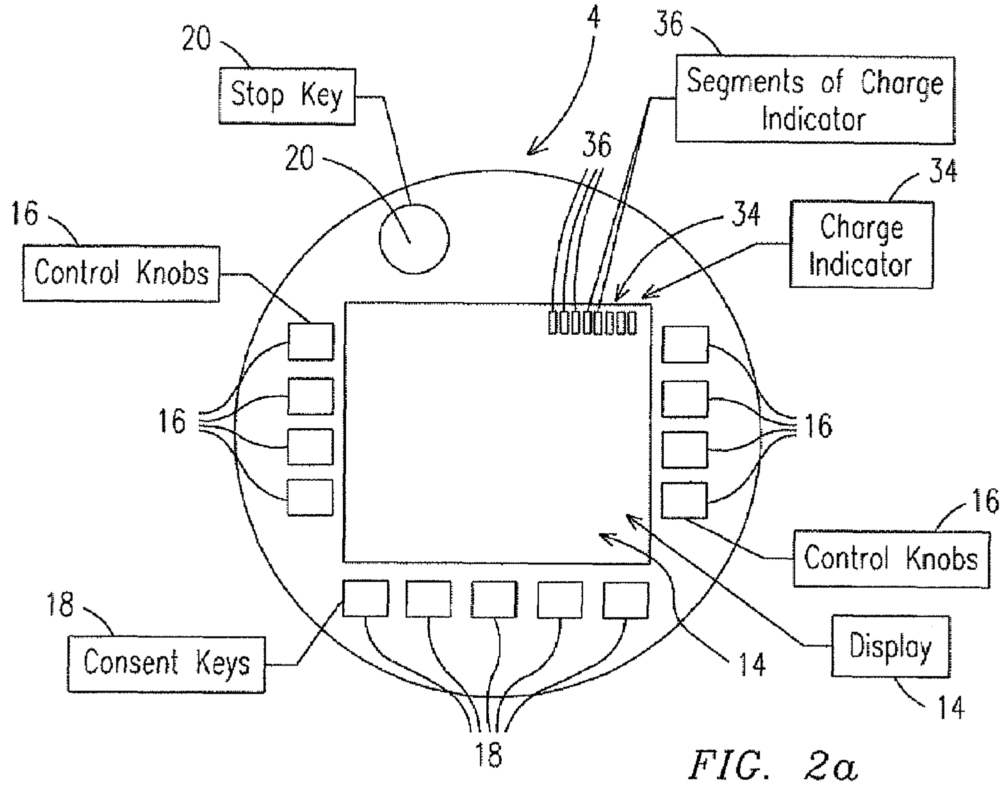
FIG. 2 shows schematically a top view of an alternative configuration of a mobile communication device in four different operating states (a to d).

In FIG. 2*a* the accumulator 22 is fully charged, which is why all eight segments 36 of the charge indicator 34 are shown as solid black bars. Operating the communication device 4 consumes energy stored in the accumulator 22. The state of charge of the accumulator 22 falls, whereupon, starting from the left-hand side, the segments 36 of the charge indicator 34 are gradually extinguished.

Although not displayed, the remaining operating time of the communication device 4 is constantly determined internally within the device and transmitted to the control device 28 and monitored, so to speak, by said control device. Calculation of the remaining operating time in the communication device 4 is made in the me assuring device 26 from the state of charge of the accumulator 22, the resulting final amount of energy in the accumulator 22 and the present current consumption of the communication device 4 per unit of time, either as a fixed empirical value or measured by an ammeter, not shown.

In FIG. 1*b*, the maximum remaining operating time is determined to be a time of 30 minutes. Four of the eight segments 36 are extinguished, and the accumulator 22 has therefore dropped to its half-charged state. The value of 30 minutes of remaining operating time is set as a threshold value in the control device 28. The following measure is therefore taken by the control device 28 at this time: when a remaining operating time of 30 minutes is reached, the expected maximum remaining operating time of the communication device 4 that is left is overlaid in an alphanumeric representation in a status bar 38 below the charge indicator 34.

At the same time, an alert window 40 is overlaid on the display 14. In the alert window 40, the user is informed by means of the text message "Critical battery state reached" that the accumulator 22 has dropped to a critical state of charge, in this case the accumulator 22 has reached the half-drained state.

By this means, the user is also advised to note from this point onward the remaining operating time for which the communication device 4 will maximally remain operational. The alert window 40 which covers e.g. plant process information shown on the display 14 can be made to disappear by pressing on a control knob 16. The status bar 38 by contrast remains overlaid during the 30-minute-long remaining operating time of the communication device 4. The status bar 38 supplies the user from this time onward with more precise information about the operating time remaining than the charge indicator 34. If, on the other hand, the accumulator 22 is, as in FIG. 1 or 2*a*, more than half-charged, which corresponds to a remaining operating time of over 30 minutes, no status bar 38 is overlaid, so as not to burden the user with unnecessary information.

In FIG. 1*b*, the full safety-relevant functionality of the communication device 4 continues to be available, i.e. all consent keys 18 and the stop key 20 are operational. The functionality of some control knobs 16, however, is changed to the effect that said control knobs no longer trigger a function in FIG. 2*b*. The blocked functions are defined for triggering processes in the plant 2 which last longer than 30 minutes and thus exceed the remaining operating time of the communication device 4. In order that the user will no longer inadvertently trigger these processes at the time shown in FIG. 2*b*, which would necessarily lead to a loss of control after 30 minutes, these functions are no longer available.

Where there is a linear decline in the state of charge of the accumulator 22 over time, one segment 36 of the charge indicator 34 disappears every seven-and-a-half minutes. In the status bar, by contrast, the remaining operating time is displayed with to-the-minute accuracy. In FIG. 1*c*, the remaining operating time stands at eight minutes, which is why two segments 36 of the charge indicator 34 can still be seen.

When the eight-minute limit is reached, a further threshold value is filed in the communication device 4 in the control unit 28, in which case as a measure an alert window 40 again appears in the display 14. The alert message indicates that the consent keys 18 are deactivated with immediate effect. That is, a consent key 18 being pressed at this moment is deactivated, the consent function is therefore immediately withdrawn via the control line 30, which leads to an immediate halt of the movement caused by said consent key in the plant 2. Also, no further safety-critical function can be triggered via the other consent keys 18. In addition, the alert window 40 informs the operator of the fact that the stop key 20 is still operational, but that the stop function in the plant is not activated, that the plant therefore continues to be in a normal operating state. Pressing the stop key 20 would nonetheless bring about an immediate plant shutdown.

The operator now knows that he has another eight minutes to complete his work with the communication device 4 and to log off said communication device properly from the plant 2 or to switch off said communication device. Since this already constitutes a critical user alert in this case, the alert window 40 is shown flashing, accompanied by acoustic alarm tones from a loudspeaker, not shown, and by vibration of the communication device 4, that is, by vibration of the accumulator 22. This draws the attention of the user to the display 14, even if said user is not looking in that direction as he is monitoring e.g. the plant 2.

If the user does not carry out a defined log-off of the communication device 4 from the plant 2, then there is the risk that the accumulator 22 will be discharged fully, the radio contact 6 to the plant 2 torn down as a result and the plant 2 would enter a dangerous operating state which will, however, be intercepted by the plant's internal emergency shutdown (STOP).

Figure 2B:
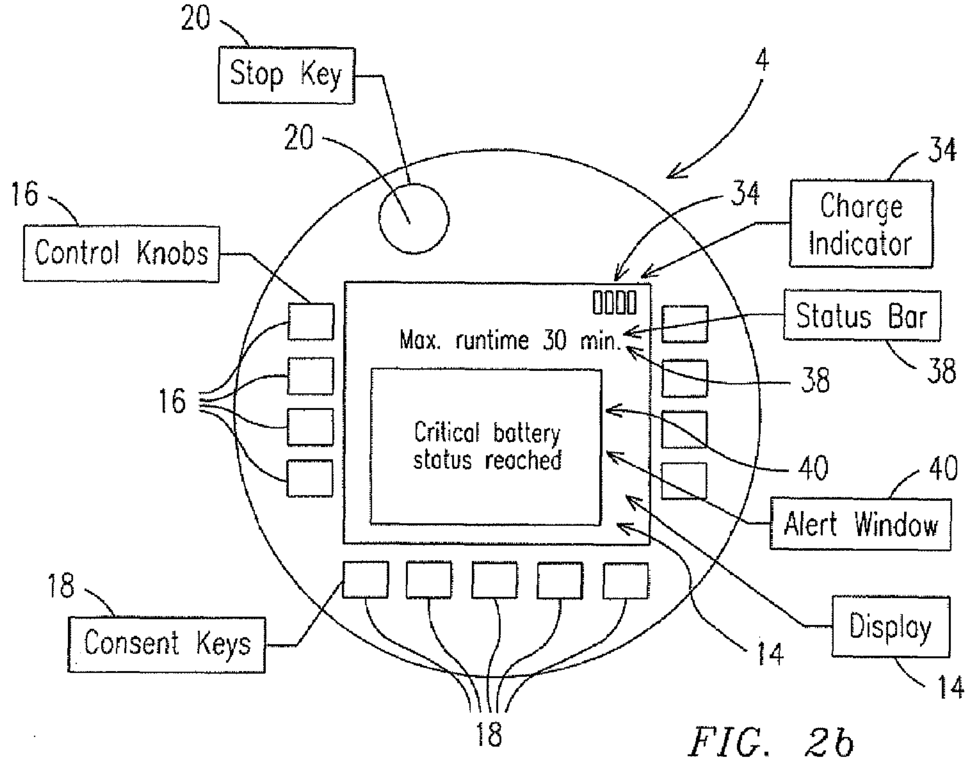
Figure 2C:
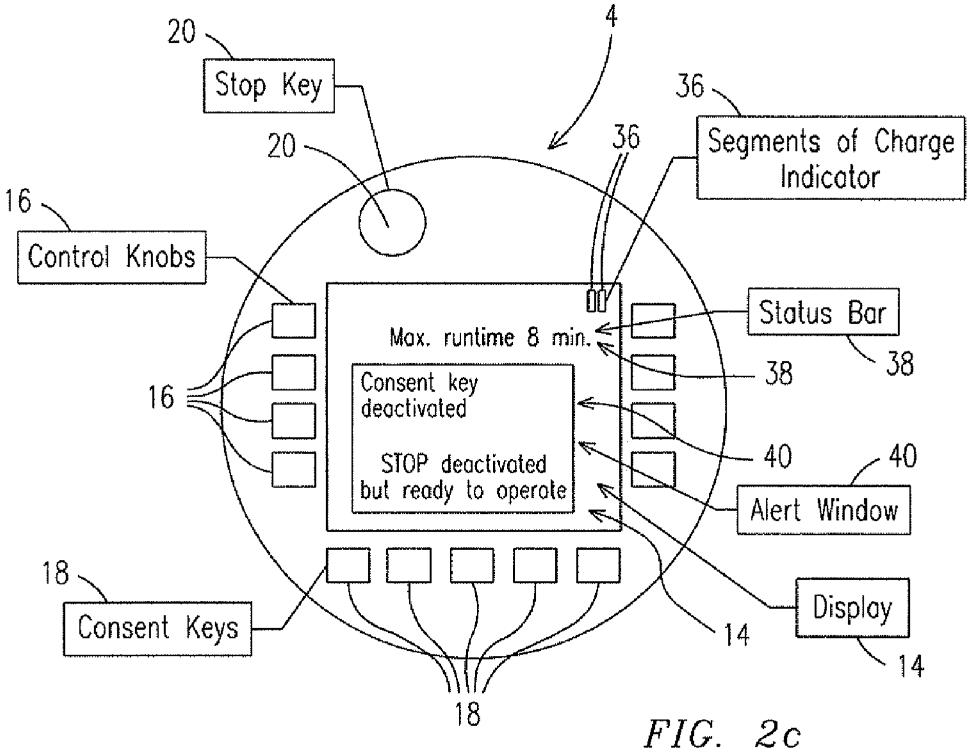
Figure 2D:
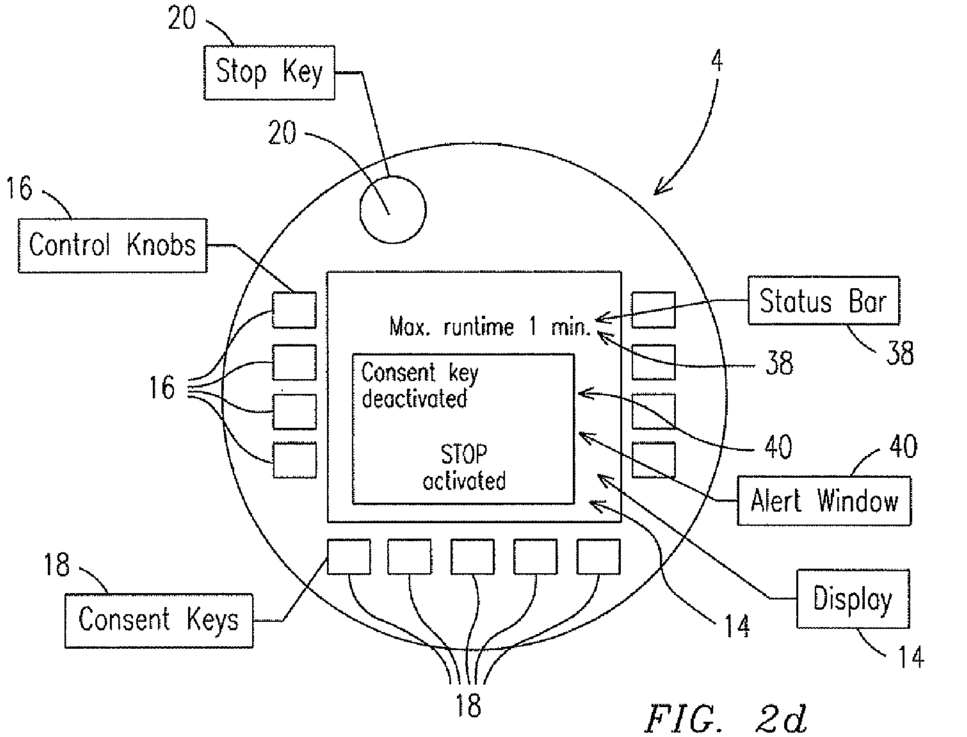

In order not to have to resort to this final safety mechanism, in FIG. 2*d*, the stop function in the plant 2 is activated, i.e. the plant 2 is brought to a halt in a defined manner from the communication device 4, when there is a remaining operating time of one minute. This is effected by a threshold value of one minute in the control device 28 being set as a measure and is achieved through activation of the stop key 20 via the control line 32. This is in turn communicated to the user via an alert window 40, which can no longer, as in FIG. 1*b* and *c*, be removed by pressing a control knob 16. According to FIG. 1*d*, the user of the communication device is left with just the option of connecting said communication device again e.g. to an accumulator-charging station, not shown, located in the plant 2 or at least of switching it off at least within the last minute of operation so as to avoid a deep discharge of the accumulator 22.

The various stages of alert in FIGS. 2*b* and 2*c* should, however, normally prevent the final alert stage shown in FIG. 2*d* from being activated and the plant thus brought to a halt. This leads, for example, to losses of production and other disadvantages which are associated with a plant shutdown. Through the various alert thresholds and alert messages 40, the operator should log off the communication device 4 properly from the plant 2, at least before the final threshold of one minute of remaining operating time is reached, just so as to avoid such a plant shutdown.

The invention claimed is:

1. A method of communicating with a technical facility, comprising:
- providing a battery-operated wireless communication device having a battery for power supply for establishing communication with the technical facility, wherein the communication relates to operating and monitoring for performing industrial manufacture;
- determining a state of charge of the battery;
- determining a remaining operating time of the communication device based on the determined state of charge; and
- adjusting the functionality of the communication device to operate the technical facility based on the determined remaining operating time.

2. The method according to claim 1, further comprising:
- prescribing a threshold value for the remaining operating time; and
- intervening with the technical facility or with the communication device only if the threshold value is violated by the determined remaining operating time.

3. The method according to claim 1, wherein the intervention includes displaying the remaining operating time to an operator of the communication device.

4. The method according to claim 1, wherein the state of charge and the remaining operating time are continuously determined, further comprising:
- prescribing a plurality of threshold values; and
- adjusting the functionality based on a relationship between either a change in the state of charge or a change in the remaining operating time and the threshold values.

5. The method according to claim 1, wherein the communication device is configured to trigger a consent function at the technical facility, and adjusting the functionality includes deactivating the consent function.

6. The method according to claim 1, wherein the communication device is configured to trigger a stop function at the technical facility, and adjusting the functionality includes activating the stop function.

7. A device for communicating with a technical facility, comprising:
- a battery operated wireless communication device for exchanging data with the technical facility regarding operating and monitoring industrial manufacture;
- a measuring device for determining a state of charge of the battery and for determining a remaining operating time of the communication device;
- a control device connected to the measuring device for executing an activity in the technical facility or in the communication device based on the determined remaining operating time; and a change-over switch connected to the control device for adjusting functionality of the communication device to operate the technical facility.

8. The device according to claim 7, further comprising a threshold switch connected to the measuring device and to the control device.

9. The device according to claim 7, further comprising a display device for displaying the determined remaining operating time.

10. The device according to claim 7, further comprising a consent key connected to the change-over switch such that the consent key can be deactivated via the change-over switch.

11. The device according to claim 7, further comprising a stop key connected to the change-over switch such that the stop key can be activated via the change-over switch.

* * * * *